United States Patent [19]

Knowles

[11] 3,813,486

[45] May 28, 1974

[54] IMAGE ANALYSIS

[75] Inventor: William Ralph Knowles, Royston, England

[73] Assignee: Image Analysing Computers Limited, Royston, England

[22] Filed: Oct. 28, 1970

[21] Appl. No.: 84,721

[30] Foreign Application Priority Data

Oct. 31, 1969 Great Britain .................... 53405/69
Mar. 5, 1970 Great Britain .................... 10560/70

[52] U.S. Cl. ............................ 178/7.1, 178/DIG. 39
[51] Int. Cl. ............................................. H04n 5/14
[58] Field of Search ....... 178/7.1, 7.2, 7.55, 7.5 DC, 178/7.3 S; 340/347 CC; 325/323, 326; 307/237, 235; 328/54, 53, 164–169, 173, 146, 149, 150, 151

[56] References Cited

UNITED STATES PATENTS

| | | | |
|---|---|---|---|
| 2,444,438 | 7/1948 | Grieg | 328/54 |
| 2,523,283 | 9/1950 | Dickson | 328/165 |
| 2,855,513 | 10/1958 | Hamburgen | 178/7.1 R |
| 2,885,551 | 5/1959 | Greanias | 250/27 |
| 2,950,342 | 8/1960 | Revercomb | 178/7.3 S |
| 2,975,371 | 3/1961 | Greanias | 328/168 |
| 3,115,545 | 12/1963 | Gebel | 178/6.8 |
| 3,223,778 | 12/1965 | Stone et al. | 178/7.1 |
| 3,322,893 | 5/1967 | Townsend | 178/6.8 |
| 3,368,153 | 2/1968 | Garde | 328/164 |
| 3,379,826 | 4/1968 | Gray | 178/7.1 |
| 3,463,940 | 8/1969 | Kaye et al. | 178/7.1 DC |
| 3,472,958 | 10/1969 | Estock | 178/7.1 |
| 3,489,921 | 1/1970 | Mietz et al. | 328/146 |
| 3,515,803 | 6/1970 | Lorang | 178/7.1 |
| 3,566,281 | 2/1971 | Baumann | 307/235 |

*Primary Examiner*—Robert L. Griffin
*Assistant Examiner*—George G. Stellar
*Attorney, Agent, or Firm*—Browne, Beveridge, De Grandi & Kline

[57] ABSTRACT

The invention concerns image analysis systems employing a source of scanned video signal and threshold detector means for generating a binary signal whose value depends on the fulfilment or otherwise of the detection criterion. Means are provided for accumulating at least the low frequency content of the video signal and deriving therefrom a correcting voltage for application to the detector means to reduce variations between the peak value of the video signal corresponding to the background of the image and the threshold level of said detector means.

3 Claims, 22 Drawing Figures

INVENTOR:
WILLIAM RALPH KNOWLES
by
Beveridge + De Grandi
Attorneys

INVENTOR
WILLIAM RALPH KNOWLES
by
Beveridge + De Grandi
Attorneys

INVENTOR
WILLIAM RALPH KNOWLES
by
Beveridge + De Grand
Attorneys

INVENTOR:
WILLIAM RALPH KNOWLES
by
Beveridge + DeGrandi
Attorneys

INVENTOR
WILLIAM RALPH KNOWLES
by
Beveridge + De Grandi
Attorneys

INVENTOR
WILLIAM RALPH KNOWLES
by
Beveridge + De Grandi
Attorneys

INVENTOR
WILLIAM RALPH KNOWLES
by
Beveridge + De Grandi
Attorneys

PATENTED MAY 28 1974 3,813,486

SHEET 08 OF 11

INVENTOR
WILLIAM RALPH KNOWLES
by
Beveridge + De Grandi
Attorneys

INVENTOR:
WILLIAM RALPH KNOWLES
by
Beveridge + De Grandi
Attorneys

INVENTOR
WILLIAM RALPH KNOWLES
by
Beveridge + DeGrandi
Attorneys

INVENTOR
WILLIAM RALPH KNOWLES
by
Beveridge + De Grandi
Attorneys

IMAGE ANALYSIS

This invention concerns image analysis and in particular a system for reducing the effect of a background shading introduced by variation in sensitivity over the target area in a camera tube.

In the image analysis system described in our British Patent No. 1,127,743 a scanned electrical video signal from a television camera is detected by threshold discriminator means for subsequent analysis. When background shading is present in such a system the same feature will produce a different amplitude video signal when located in different parts of the camera field of view.

It is an object of the present invention to provide a device by which the effect of background shading can be largely eliminated from such a system.

According to the present invention in an image analysis system employing a source of scanned video signal and threshold detector means for generating a binary signal whose value depends on the fulfilment or otherwise of the detection criterion, there is provided means for accumulating at least the low frequency content of the video signal and deriving therefrom a correcting voltage for application to the detector means to reduce variations between the peak value of the video signal corresponding to the background of the image and the threshold level of said detector means.

In one embodiment of the invention, a so-called differentiating circuit is provided between the output of the source of video signal and the input to the detector means, the time constant of the differentiation circuit being such as to render the circuit unresponsive to changes in amplitude of the video signal which are slow as compared with changes in signal amplitude corresponding to small features and feature boundaries in the image. It will be appreciated that the detector means may be formed from any number of separate threshold detectors, in parallel for applying differing detection criteria to the video signal.

This first embodiment allows small features to be detected even in the presence of severe shading. However this simple embodiment has the disadvantage that a small feature which is close to the back edge of a large feature, may not be detected correctly or may be totally missed. This results from the differentiating circuit acting on both the leading and trailing edge of the detected feature.

It has been found that this disadvantage can be largely removed by employing a differentiating circuit whose time constant in the forward direction is much greater than the time constant in the reverse direction. Where the differentiating circuit comprises a small capacitor followed by a large resistance across which the differentiated output signal is developed, a low reverse time constant can be obtained by connecting a diode with appropriate polarity, across the high resistance.

In another embodiment of the present invention, the video signal may be differentiated by delaying the video signal for a time period at least equal in duration to the time to scan across the largest feature in the field of view and combining the delayed signal with the current video signal before detection.

In one arrangement the delayed signal may be formed by connecting the video output to a short-circuited delay line. Alternatively, the video output may be connected to a delay line and the video output and delayed video signal applied to a subtraction device, the output of which is supplied to the threshold detector. In the latter case, a delay line of twice the length of the short-circuited delay line of the first arrangement, must be used.

It will be appreciated that such an arrangement is restricted to images containing small features which are widely spaced apart otherwise the result will be that the second of two features which are close together will not be detected.

In a more preferred embodiment of the invention, the video signal is passed through a low pass filter and substracted from the original video signal. It will be appreciated that the filter will introduce an effective time delay and in order to obtain correct registration a corresponding delay must be introduced in the unfiltered signal path to the subtraction device. However the time delay required of such a device may be smaller than that required of the delay line in the previous embodiments with a proportionate reduction in the areas of paralysis behind features.

So far it has been assumed that the reference threshold applied by the detection means remains constant. To this end the systems described so far have sought to render the DC level of the video signal constant so that it can be compared with a constant voltage (the reference threshold voltage) in the detection means. It will be appreciated however, that if the threshold level also varies in accordance with any variation of sensitivity of the source of video signal, the original video signal can be employed for detection since the threshold level employed in the detector means will vary in accordance with shading variations of the original video signal. To this end in another embodiment of the invention the video signal is passed through a low pass filter which removes the high frequency content of the video signal relating to feature boundaries and sudden changes in density to form the correcting voltage which serves as, or controls the value of, the threshold voltage for the threshold detector means.

The results obtained from this last described arrangement are synonymous with those obtainable from the first described embodiment and a distinct improvement can be obtained by supplying the video signal to the low pass filter through a polarity sensitive device such as a diode thereby to produce different charging time constants for currents flowing in opposite directions. Such an arrangement comprises a so-called peak level integrating circuit.

According to another aspect of the invention, means is provided for generating a varying signal corresponding to the inverse of the variation in sensitivity of the source of video signal (and thereby the inverse of the shading characteristic of the source), means is provided for delaying the original video signal by an amount equal to any delay introduced by the means for generating said inverse signal, and a variable gain amplifier is provided whose input is supplied with the delayed video signal and whose gain is varied by a signal proportional to the said inverse signal to thereby provide a compensated video signal for application to a detector whose threshold level may therefore be constant. The inverse signal may be obtained by passing the original video signal through a low pass filter or a circuit arranged to produce a signal corresponding to the peak level of the video signal and amplifying the resulting signal by an amplifier whose transfer function is such that the point of its input and output signals is a constant.

The invention will now be described by way of example with reference to the accompanying drawings in which:-

FIG. 1 is a block schematic diagram of part of an unmodified image analysis system, FIG. 2 illustrates graphically the video signals corresponding to features in an image under analysis by the unmodified system of FIG. 1, FIG. 3 is a block schematic diagram of one embodiment of the present invention, FIG. 4 illustrates the signals obtained at different parts of the system illustrated in FIG. 3 for different features in a vield of view, FIGS. 5*a* and 5*d* illustrate graphically how inaccuracies can occur from using the simple embodiment of FIG. 3, FIG. 6 illustrates a modification of the embodiment of FIG. 3 which seeks to reduce the regions of paralysis behind large features, FIGS. 7*a* to 7*d* illustrate diagrammatically wave forms obtainable at various points in the circuit of FIG. 6 and correspond to those contained in FIGS. 5*a* to 5*d* whereby comparison may be made, FIGS. 8*a* to 8*d* illustrate diagrammatically deficiencies present in the arrangement of FIG. 6, FIG. 9 is a block circuit diagram of another embodiment of the invention in which background shading is reduced by combining the current video signal with delayed video signal, FIG. 10 illustrates graphically wave forms obtainable at various points in the circuit of FIG. 9, FIGS. 11*a* to 11*d* illustrate graphically a deficiency of the system illustrated in FIG. 9, FIG. 12 is circuit diagram of another embodiment of the present invention employing a delay line to reduce background shading, FIG. 13 is a circuit diagram of a further embodiment of the invention. FIGS. 14*a* to 14*e* illustrate wave forms obtainable at different points in the circuit of FIG. 13, FIG. 15 is another block diagram of a further embodiment of the invention and FIGS. 16*a* to 16*c* represent wave forms obtainable at different points of the circuit of FIG. 15, FIG. 17 is a circuit diagram of one practical realisation of the block circuit diagram arrangement of FIG. 15 and FIGS. 18*a* to 18*c* illustrate diagrammatically an advantage obtained by the circuit of FIG. 17, FIG. 19 is a block circuit diagram of a further embodiment of the present invention and FIGS. 20*a* to 20*f* illustrate graphically wave forms obtainable at different points in the circuit of FIG. 19, and FIG. 21 is a further block schematic diagram of another embodiment of the present invention operating on a similar principle to that employed in FIG. 19 and FIGS. 22*a* to 22*e* illustrate wave forms obtainable at different points of the circuit of FIG. 17.

In FIG. 1 the front end of an image analysis system is shown comprising a source of video signal such as a television camera 10 and a threshold discriminator 12 forming a detector. The discriminator 12 is responsive to the video output from the source 10 and supplies a detected video signal for subsequent display and comparison purposes.

FIG. 2*a* illustrates diagrammatically a single scan line 14 intersecting two small features 16, 18 and a large feature 20 of an image under analysis. FIG. 2*b* illustrates the idealised video signal corresponding to the camera output resulting from the scan line 14 intersecting the three features 16, 18 and 20. FIG. 2*c* illustrates a typical output signal from the source which includes a component which may be rising or falling (shown rising in FIG. 2*c*) corresponding to background shading. The total swing of this variation is usually small and it is therefore not noticeable visually or when dealing with high contrast features. However, when dealing with low contrast features the variations due to shading can result in obliteration of the video signal corresponding to some features and the creation of video signal corresponding to other features which are in fact non-existent. Both of these outcomes are illustrated in FIG. 2*d* and can be explained by referring back to FIG. 2*c*.

An increasing component due to shading results in the general level of the video signal rising from below the threshold detection level (indicated by a dotted line 22 in FIG. 2*c*) to above this level. Any features wholly below this level such as 24 will not be detected as shown in FIG. 2*d*. A feature which rises from a point below to a point above the detection level will be detected such as 26 (resulting in 26' in FIG. 2*d*) and also 28 (resulting in 28' in FIG. 2*d*). However, since the level of the video signal continues to rise at the end of feature 28, as soon as the background level (represented by the lower horizontal line segments of the video signal) rises above the threshold level 22, the background level 30 will also be detected and result in a feature output 30'. This in fact is an incorrect signal since at that point there is no feature.

A system subject to shading distortion is thus quite hopeless for accurate image analysis when dealing with features whose contrast is insufficient to clearly distinguish them from the variations in background density due to shading.

FIG. 3 illustrates a modified image analysis system in which a so-called differentiating circuit comprising a capacitor C and a resistor R is interposed between the source output and the discriminator input. The resistance of R is adjustable by control V to vary the charging rate of the capacitor. FIG. 4*a* illustrates the effect of differentiating the source output (corresponding to the graphical representation of FIG. 2*c*). The signal illustrated thus comprises the output from the differentiating circuit CR as applied to the detector 12. By applying an appropriate threshold level 32 to the differentiated output of FIG. 2*a*, a corrected video signal as shown in FIG. 4*b* is obtained, which corresponds closely to the idealised video signal shown in FIG. 2*b*.

It is important to realise that this advantage can only be obtained on relatively small features such as 16 and 18. When applied to a feature as large as 20 the detection level 32 may cut off the differentiated signal earlier than it should, thereby producing a shortened pulse. Conveniently therefore the time constant of the differentiated circuit CR is adjustable to allow a system to accommodate larger or smaller features as the case may be.

FIGS. 5*a* to 5*d* show how when the simple differentiating circuit illustrated in FIG. 3 is used alone, a small feature close to the back edge of a large feature (see FIG. 5*a*) may not be detected. FIG. 5*b* is the video signal corresponding to the features 5*a* and 5*c* is the video signal after passing through the differentiating circuit and 5*d* is the detected signal. The capacitor in the differentiating circuit charges during a large feature such as 34 and after this large feature the video signal is so low until the capacitor discharges that small features such as 36 or features of low contrast such as 38 may not be detected at all.

The differentiating circuit can be modified so as to reduce this effect considerably in accordance with the first aspect of the present invention. FIG. 6 illustrates a modified differentiating circuit with a diode 40, connected across the resistor R. The presence of the diode prevents the signal across R going more negative than earth level. This results in a rapid discharge of the capacitor at the end of a large feature so that a small feature following a large feature may be detected. This is illustrated in FIGS. 7*a* to 7*d*. The rapid discharge 42 of the capacitor by the diode at the end of the feature allows the small feature 36 and the low contrast feature 38 to be detected correctly (FIG. 7*d*).

As previously mentioned the advantages of employing a differentiating circuit can only be obtained on small features because for large features such as 20 in FIG. 4 the detection threshold 32 will produce a shortened pulse. This problem is minimised by setting the threshold as near to earth level as possible. However in this event the noise content 43 (in FIG. 8) which is present in the video signal may cause false detected outputs, such as 44.

FIG. 9 illustrates a modified image analysis system with a short-circuited delay line 46 connected so that the signal to the threshold detector 12 is the sum, produced by resistor 45, of the signal from the scanner 10 and the signal reflected by the delay line 46.

FIGS. 10*a* and 10*d* illustrate a typical image and the various resulting waveforms in the arrangement of FIG. 9. FIG. 10*b* shows the video output from the source provided from the feature of 10*a.* FIG. 10*c* shows the signal reflected by the delay line and 10*d* shows the complete signal applied to the threshold detector. The signal due to shading 51 is reflected by the delay line 51' and these two signals nearly cancel, leaving just a small pedestal 53 on which the video due to the feature 54 is superimposed 54'. It should be noted that after a time 2T (twice the delay of the delay line) the reflected signal 55 produced by the feature 54 arrives at the threshold detector. This produces a paralysis region behind each feature equal to the distance travelled by the scanner in the time 2T.

FIGS. 11*a* to 11*d* illustrate the effect that the circuit of FIG. 9 will have on a more complicated image. The small feature 56 is detected correctly at 56'. The signal from the large feature 58 is shortened by the reflected pulse 58' from the delay line and the second small feature 50 is lost in the reflection of the large feature 58.

In the system of FIG. 12 the short-circuited delay line is replaced by a delay line 74, of twice the length, and the output from the line is subtracted from the scanner signal at 76. Subtraction may be by polarity inversion of the delay line output and subsequent addition to the scanner signal or preferably by a differential amplifier. The resultant signal is then passed to the threshold detector 12 and it will be appreciated that the net effect on the video signal will be the same as the system of FIG. 9.

FIG. 13 of the drawings illustrates a further embodiment of the invention in which a corrected video signal is obtained for subsequent application to the detector 12. In FIG. 13 and in the following figures, the detector 12 is shown as comprising a comparator 13 having two inputs one of which is supplied with a reference threshold voltage and the other of which is supplied with the video signal to be detected. The comparator 13 compares the two signals and provides a two value output signal one value of which obtains when the video signal exceeds the threshold voltage and the other value of which obtains when the video signal is less than the threshold voltage.

Correction of the video signal is obtained by passing the video signal from the source 10 through a low pass filter 80 and subtracting the filtered video signal from the original video signal in a subtraction device 82. Since a delay will be introduced into the video signal by the filter 80, a signal delay device 84 which introduces the same time delay into the current video signal, is provided in the signal path of the video signal from the source 10 to the subtraction device 82. The delay device 84 may be a delay line or a shift register. In practice the subtraction device 82 preferably comprises a differential amplifier. The constant reference threshold potential is obtained from a potentiometer 86 and is supplied to one input of the comparator 13 and the output from the subtraction device 82 is applied to the other input of the comparator 13.

An idealised video waveform from the source 10 is shown at FIG. 14*a* corresponding to one line scan of a large feature approximately halfway along the field of view. FIG. 14*a'* illustrates the idealised video waveform of FIG. 14*a* displaced in time by a small amount corresponding to the time delay introduced by delay device 84. FIG. 14*b* illustrates the filtered output from the low pass filter 80 and FIG. 14*c* illustrates the effect of subtracting the signal *b* from *a'*. Also superimposed on FIG. 14*c* is a dotted line indicated by the reference *d* illustrating a typical reference threshold voltage with which the output from the subtraction stage 82 is compared. FIG. 14*e* illustrates the resulting detected video signal.

FIG. 15 illustrates an alternative arrangement in which the video signal is unmodified and instead the threshold voltage is compensated to follow variations in the DC level of the video signal. To this end the video output from a source 10 is supplied to a comparator 12 via a delay device 88 which may be a delay line or a shift register. At the same time the video signal is passed through a peak voltage integrator comprising a rectifying diode 90 and peak voltage capacitor 92 whose capacitance is designated C. The forward charging resistance of the circuit is designated by a series resistance 94 whose ohmic resistance is given by *r*. The ohmic resistance *r* is variable by control 95 to vary the charging rate for capacitor 92. The peak voltage is developed across a potentiometer 96 connected in parallel with the capacitor 92 and the tapping of the potentiometer supplies the second input to the comparator 98 forming a part of the detector 12. The voltage at the tapping of the potentiometer 96 serves as a reference threshold voltage with which the instantaneous value of the video signal can be compared.

The resistance of potentiometer 96 is made large compared with the resistance $r$ of resistor 94 so that the forward charging time constant of the peak value circuit is approximately given by the product of $r$ and C. The time delay introduced by the delay device 88 is thus made approximately equal to the time constant $rC$.

Changes in the average value of the video signal will appear as changes in the value of the total voltage developed across the potentiometer 96 and proportionate changes will appear in whatever voltage is tapped from the potentiometer. If therefore there is a 15 percent swing in the average value of the video signal from the source 10, a corresponding variation will appear at the tapping of the potentiometer 96. It will be appreciated however that whereas the forward time constant of the charging circuit will be small the reverse charging time constant will be determined by the product of the resistance of the potentiometer 96 and the capacitor 92. The circuit will therefore present an asymmetrical charge and discharge characteristic which can be used to advantage to prevent the threshold voltage across 96 from following video signal variations corresponding to features. It will be appreciated that if the diode 90 is removed from FIG. 15 a simple low-pass filter remains which will also provide a correcting signal. However this simplified arrangement suffers from the same disadvantages as the circuit of FIG. 3 since it has a symmetrical charge/discharge characteristic.

An idealised video waveform is shown in FIG. 16*a* which corresponds to a single line scan intersecting a single feature in which shading error occurs in the signal and constitutes a rising DC component in the video signal. FIG. 16*a'* shows the same signal delayed in time by a sufficient amount to accommodate the delay introduced by the time constant of the peak value circuit of FIG. 16. FIG. 16*b* illustrates the asymmetric nature of the charging and discharging characteristics of the peak value circuit. Up to the leading edge of the detected video signal (after delay by the delay device 88) and which is identified by reference numeral 100 in FIG. 16*b*, the voltage across capacitor 92 follows closely the rising DC level 102 of FIG. 16*a*. As soon as the source voltage drops below the stored voltage in capacitor 92, diode 90 ceases to conduct and the value of the voltage across 92 begins to decay according to the time constant of the discharge cycle. As previously described this depends on the value of the resistor 96 and is typically very high. Thus the voltage across capacitor 92 decays very slowly. At the trailing edge of the detected feature 104 in FIG. 16*b*, the source voltage once again exceeds the stored voltage in capacitor 92 and the diode 90 begins to conduct to charge capacitor 92 by an increased amount. The voltage across capacitor 92 therefore begins to follow the rising DC level of the signal (106 in FIG. 16*a*). A comparison of FIG. 16*b* and FIG. 16*a* shows quite clearly why it is necessary to employ the delay device 88 since otherwise the changes produced in the compensated threshold voltage developed across potentiometer 96 and caused by detected video, would occur at an incorrect point in time relative to the detected edges.

FIG. 16*c* illustrates a typical two-state detected video output signal obtainable from the comparator 98.

Figure 1:
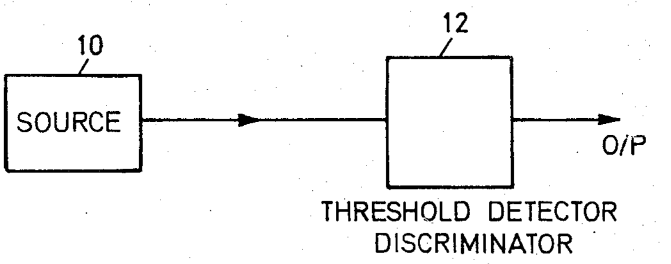
Figure 2:
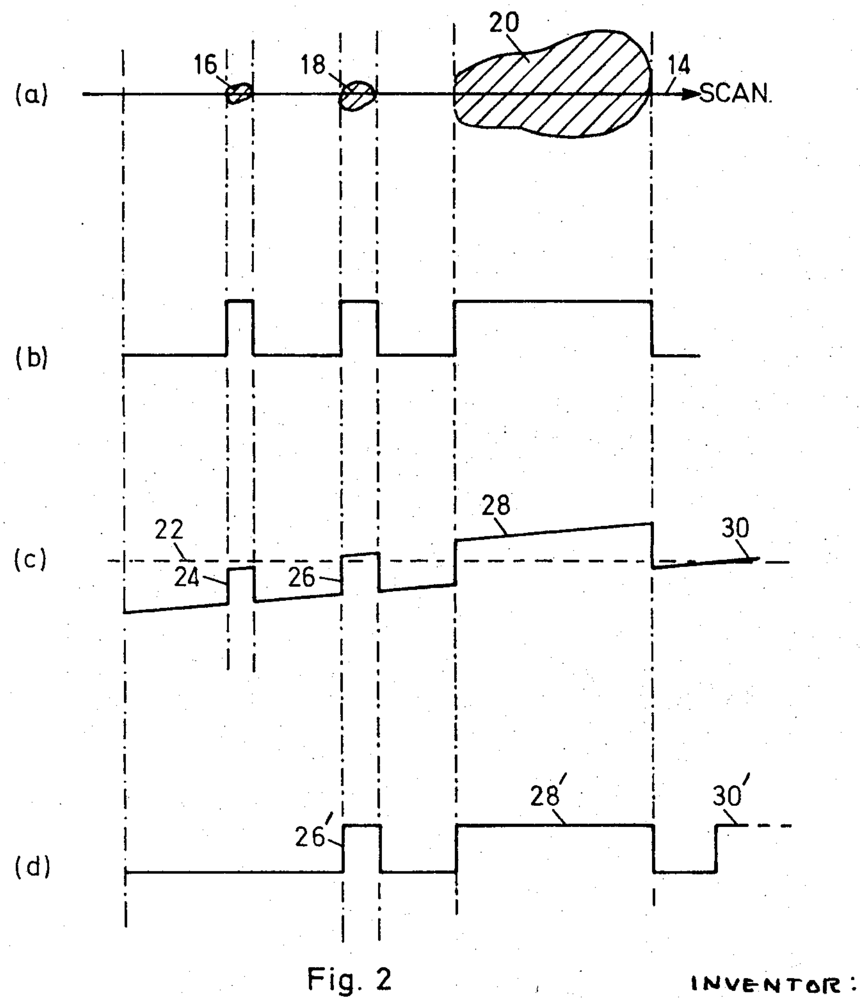
Figure 3:
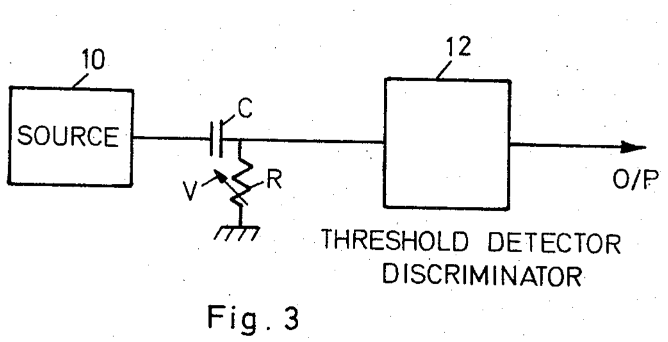
Figure 4:
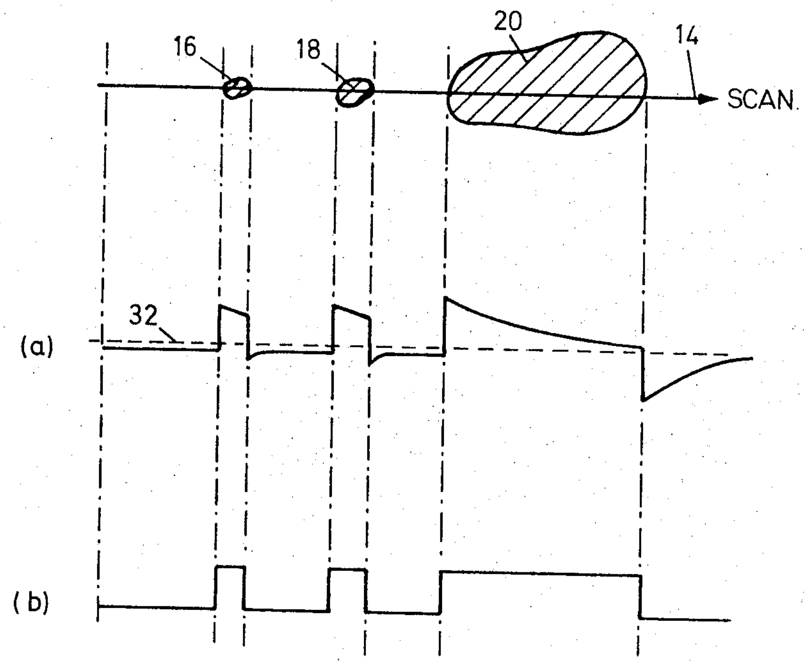
Figure 5:
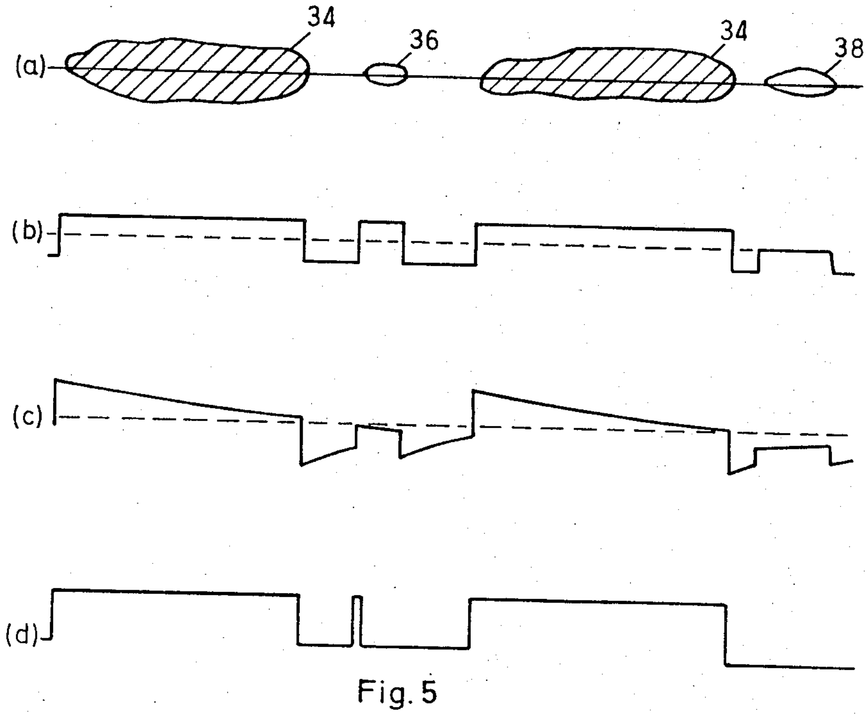
Figure 8:
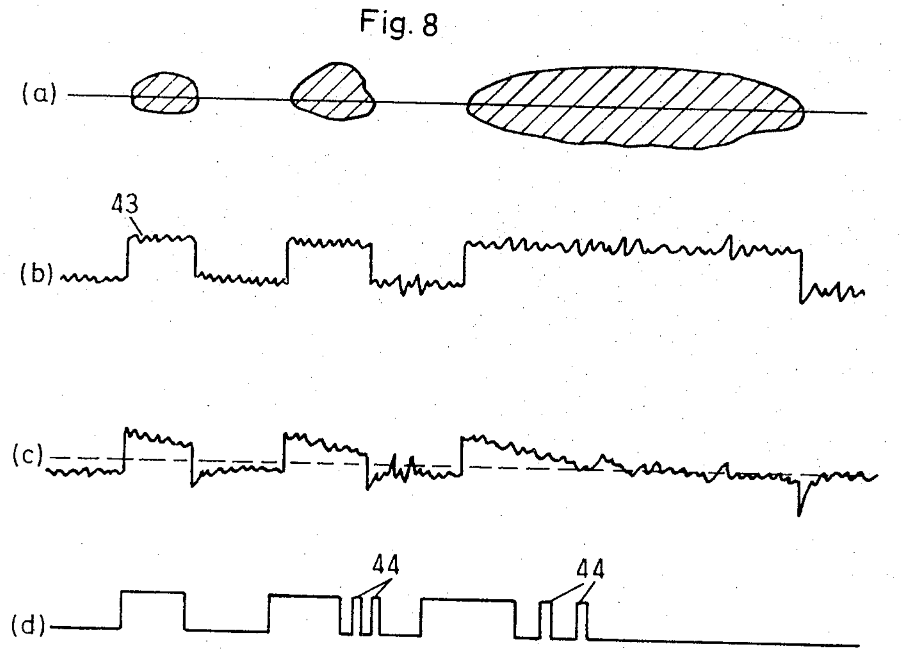
Figure 6:
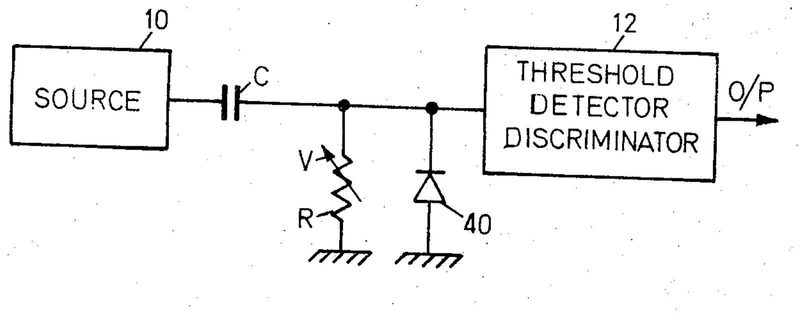
Figure 7:
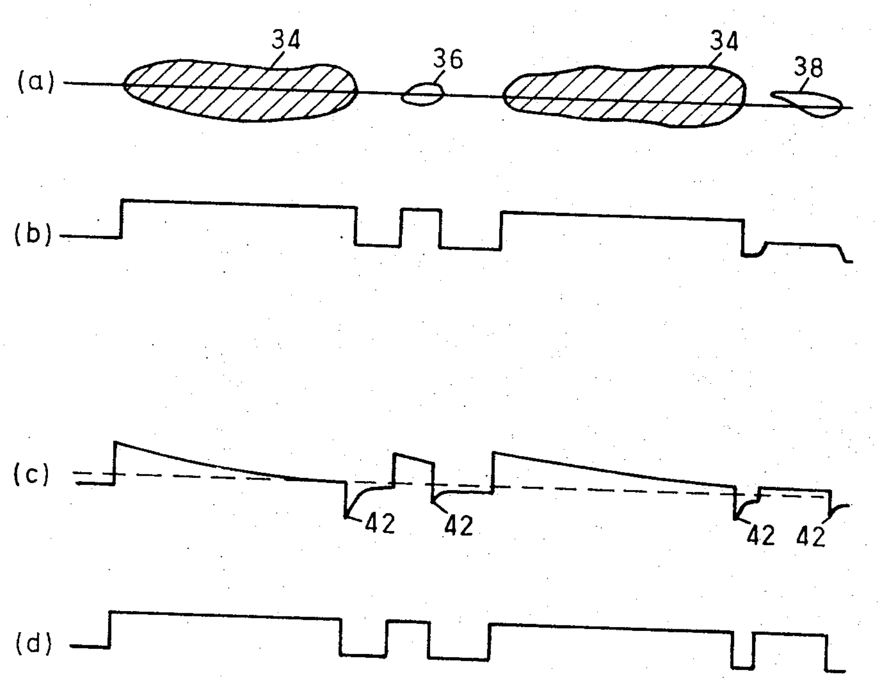
Figure 9:
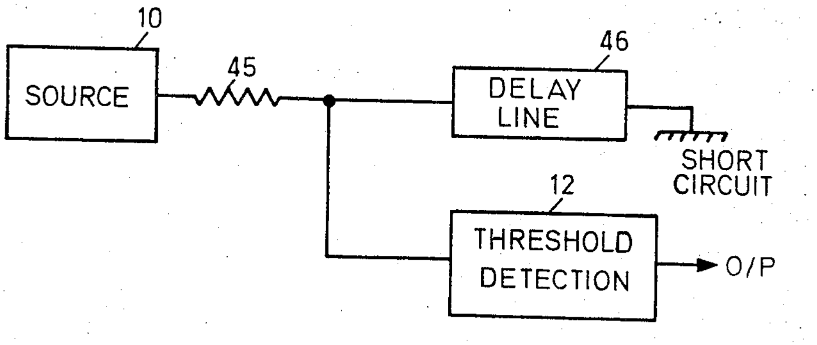
Figure 10:
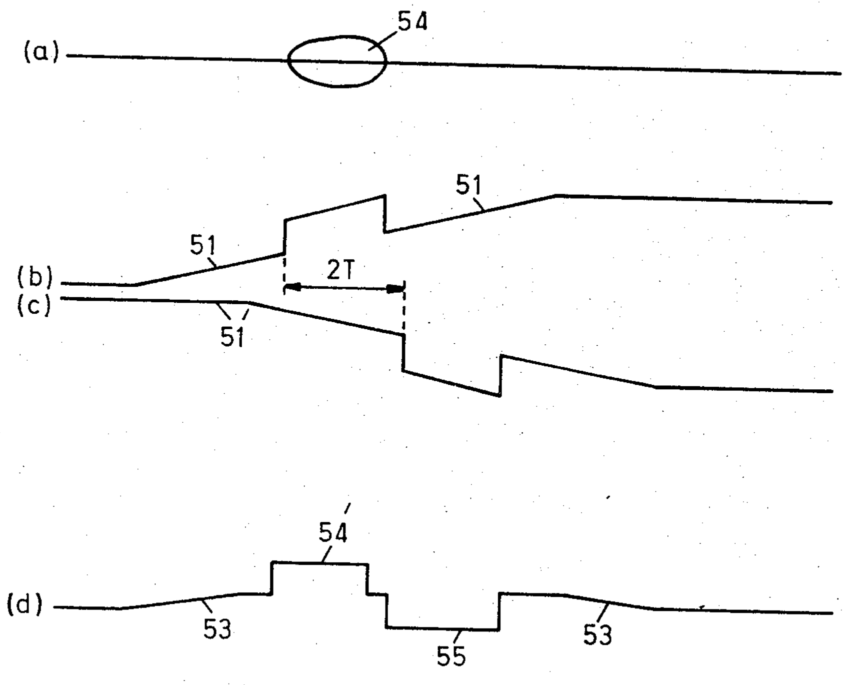
Figure 11:
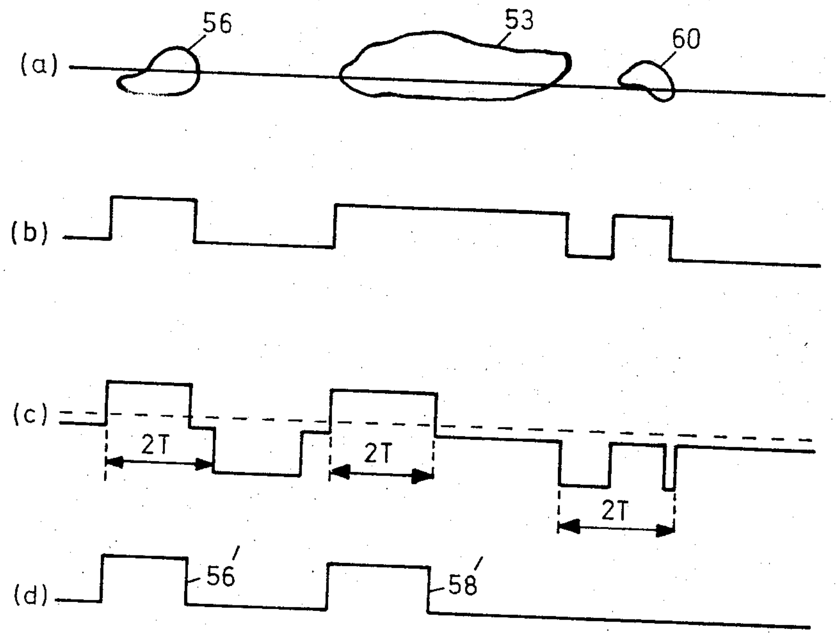
Figure 12:
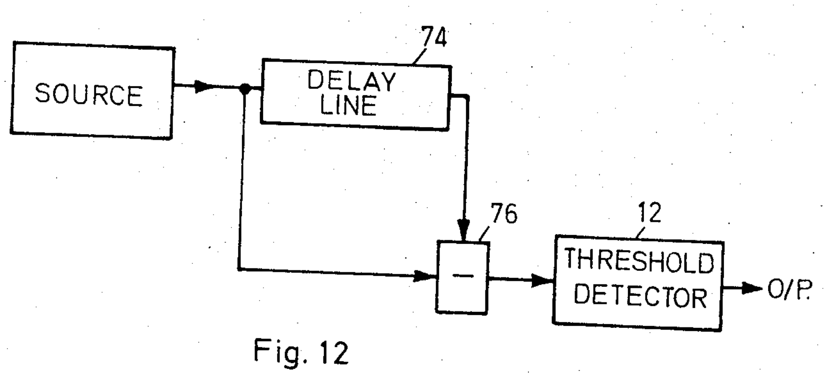
Figure 13:
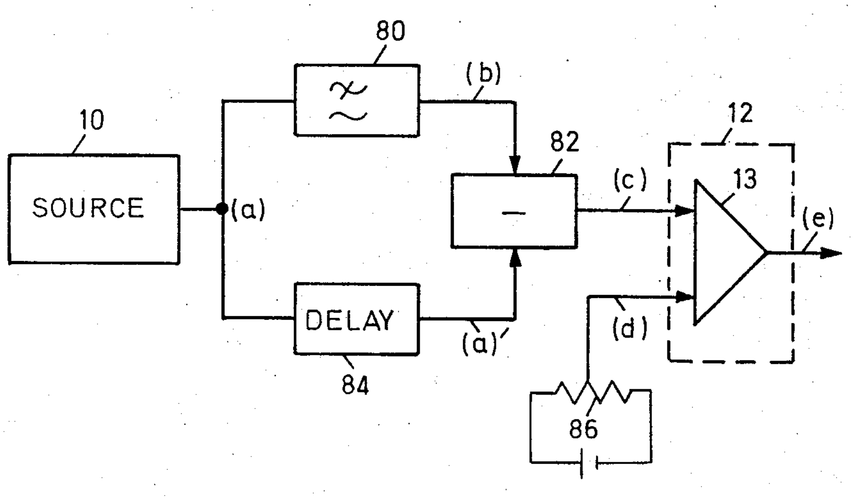
Figure 14:
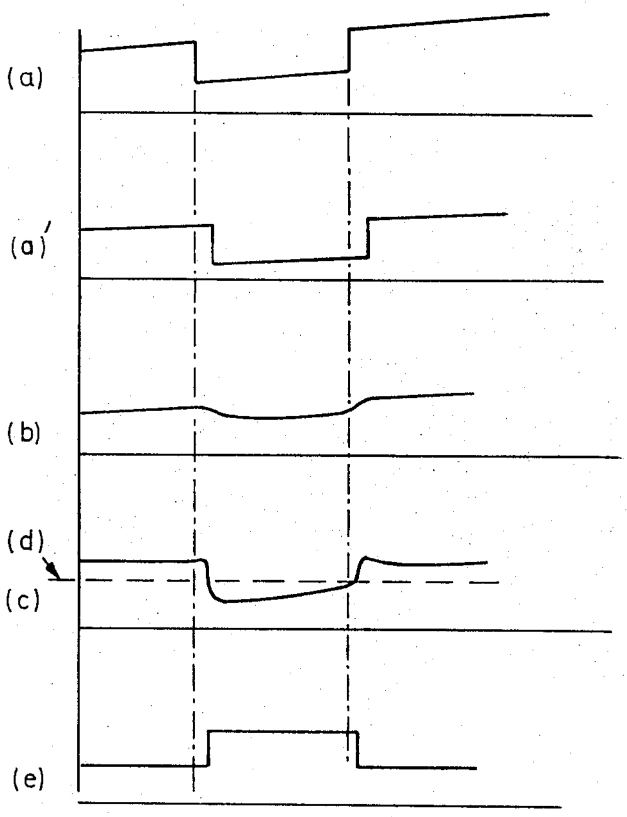

In order to improve the rise time of the peak value circuit, a differential amplifier 108 is provided between the source output and the input to the peak value circuit. One input of the differential amplifier is provided with video signal from the source 10 and the other input is provided with a voltage derived from the output from the peak value circuit. In order to allow overdetection, that is a reference voltage which is greater than the, for example, peak white level of a given video signal, a fraction only of the output from the peak value circuit is supplied to the differential amplifier 108, typically 90 percent of the peak value output, so that a voltage is developed at junction 110 which is 10 percent higher than the peak white value, for example, of the video signal. This is achieved by feeding back from junction 110 a voltage to the input of the differential amplifier 108 via a potentiometer formed from two resistors 112 and 114. The ratio of the two resistors may be adjustable or pre-set. It will be appreciated that the same effect can be obtained by providing 100 percent feedback from 110 to amplifier 108 and alternting the delayed video signal to the comparator 98 by the same amount as is produced by the resistor pairs 112, 114. It will also be appreciated that the improvement in rise time of the circuit will depend to a large extent on the amplification of the differential amplifier 108. The action of the amplifier will be to increase the effect of a very small change (in a charging direction) of the DC level of the video signal relative to the stored charge on capacitor 92.

Figure 15:
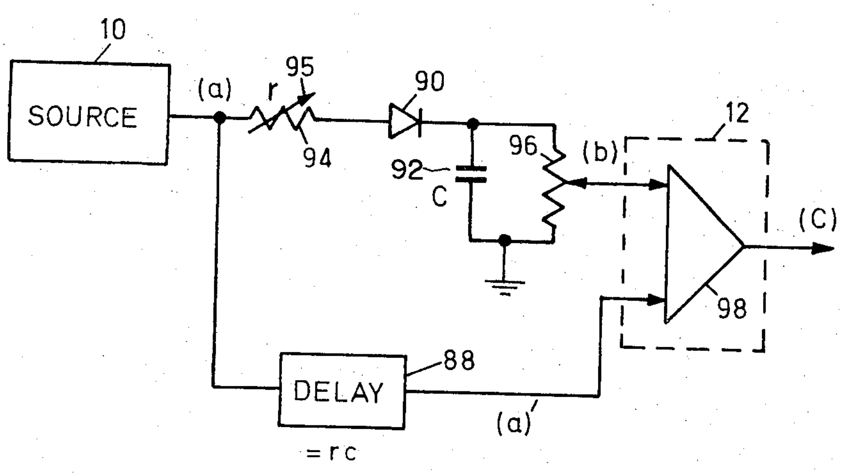
FIG. 15 is a simplified version of what would in practice be employed.
Figure 18:
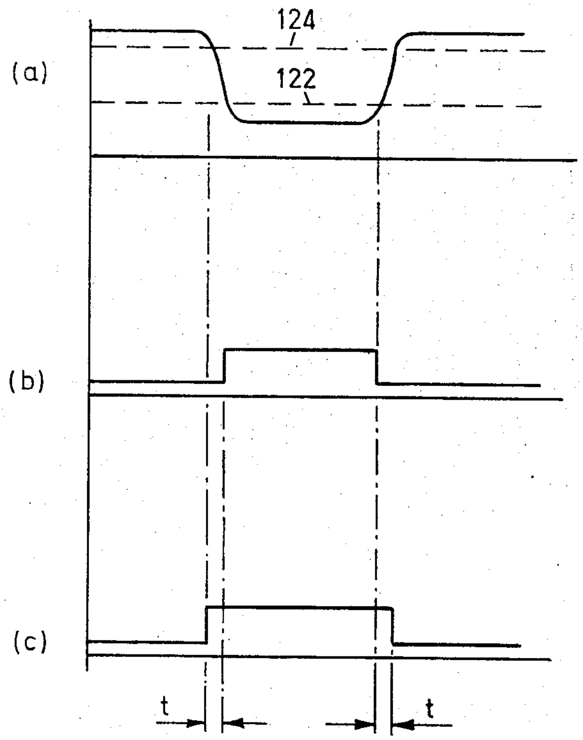

A further addition to the basic circuit of FIG. 15 is the provision of a buffer amplifier 116 between the storage capacitor 92 and the potentiometer 96. This allows matching of the load requirements for the potentiometer 96 with the high impedance peak value circuit. It will be seen that because the potentiometer 96 is no longer directly coupled across the capacitor 92, a separate discharging resistor 95 is provided in place of the potentiometer 96. The provision of the buffer amplifier 116 allows a further advantage to be obtained from the circuit by providing a gate 118 in series with the resistor 95 whereby the resistor may be open-circuited relative to the capacitor 92. By arranging that the gate 118 is open-circuited for the duration of each intersect by line scan with a feature, the droop in voltage across the capacitor 92 during the detection of large features, can be reduced substantially to zero, since the discharging resistance seen by the capacitor 92 is then the input resistance of the buffer amplifier 116, which can be made very high. To this end a comparator 120 is provided which is fed with two inputs, one from the delayed video signal from the source 10 and the other from a potentiometer 97 similar to potentiometer 96. The potentiometer 97 is set at a level indicative of the grey level of detected features and the output from the comparator 120 is arranged to close the gate 118 when that grey level is reached or exceeded. It will be appreciated that the output from comparator 98 in the detector 12 might be employed thereby eliminating the necessity for a separate comparator 120 and potentiometer 97. However the maximum benefit of the gating of the resistor 95 would not be obtained from such an arrangement and this is illustrated in FIG. 18*a*, *b* and *c*. FIG. 18*a* illustrates a typical video waveform from a single line scan intersecting a large black feature on a white background. If the threshold level determined by potentiometer 96 is set at the level indicated by the line 122 in FIG. 18*a*, the resulting idealised, detected video signal is as shown in FIG. 18*b*. If the output from the detector 12 is also applied to gate resistor 95, then this resistor is only open-circuited for the duration of the positive going pulse shown in FIG. 18*b*. It will be seen that this is considerably shorter than the actual duration of the video signal pulse corresponding to the black feature. If on the other hand, a separate threshold criterion is applied for obtaining the gating pulses applied to gate 118, most or all of the width of the video signal pulse can be employed and the gate 118 opened and closed nearer to the actual feature boundaries. Thus, for example, if the threshold criterion set by potentiometer 97 is denoted by the level 124 of FIG. 18*a*, the gate 118 will be closed for the duration of the positive going pulse shown in FIG. 18*c* thereby gaining a total increase of $2\times t$ over the gating time which would be derived from the actual detected video signal.

Figure 19:
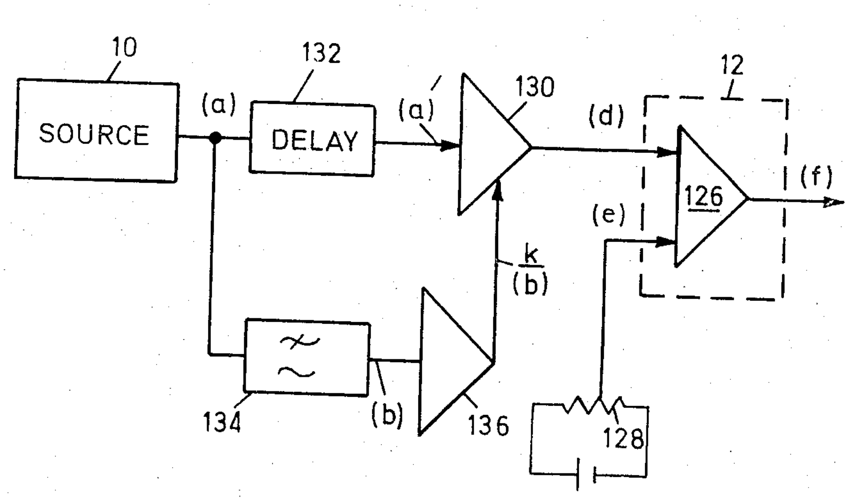

FIG. 19 illustrates another embodiment of the invention in which a corrected video signal is applied to a comparator 126 forming part of the detector 12 to which is applied a constant (that is uncompensated) threshold level from potentiometer 128. Correction of the video signal is obtained in this embodiment by means of a variable gain amplifier 130 supplied with delayed video signal from a source 10, delay being obtained by means of a delay device 132 which may be a delay line or a shift register. Video signal from the source 10 is also applied to a low pass filter 134 whose output is supplied to a buffer amplifier 136 the output of which serves as a gain control voltage for amplifier 130. The characteristics of the buffer amplifier 136 are such as to provide a signal which is inversely proportional to the output from the low pass filter 134 and to this end has been identified in FIG. 19 as corresponding to the inverse of the output from the low pass filter multiplied by some constant $k$.

Figure 16:
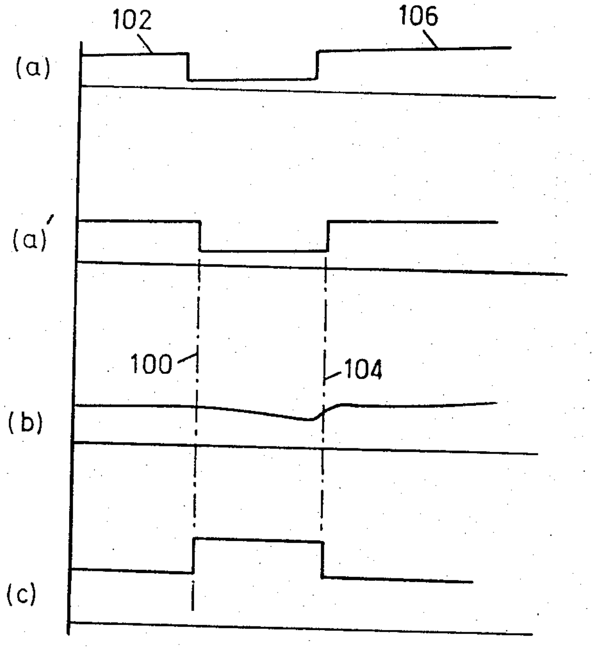
Figure 20:
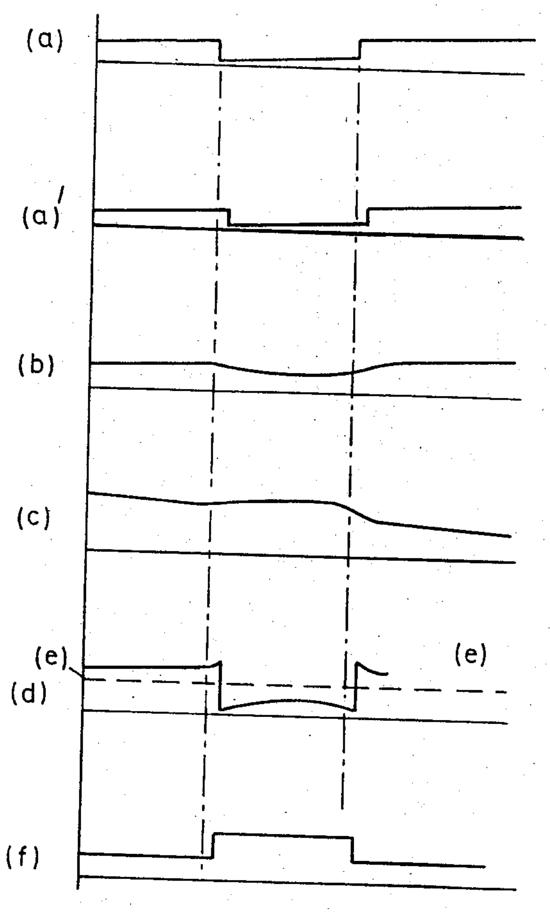

The waveforms obtainable at different points in the circuit of FIG. 19 are shown in FIGS. 20*a* to 20*f*. Thus FIG. 20*a* illustrates the idealised video signal corresponding to a single line intercept with a black feature on a white background. 20*a'* illustrates the same signal displaced in time by means of the delay device 132. FIG. 16*b* illustrates the output from the low pass filter 134 and FIG. 20*c* the output from the inverting amplifier 136. The waveform in FIG. 20*c* thus corresponds to the gain control voltage supplied to the variable gain amplifier 130. A graphical representation of the output from the variable gain amplifier 130, for the input signal 20*a'*, is given at 20*d* superimposed on which at *e*, is shown a typical reference threshold voltage as derived from the potentiometer 128. The resulting idealised detected video signal is shown in FIG. 20*f*, as would be obtained from the output of the comparator 126.

Figure 21:
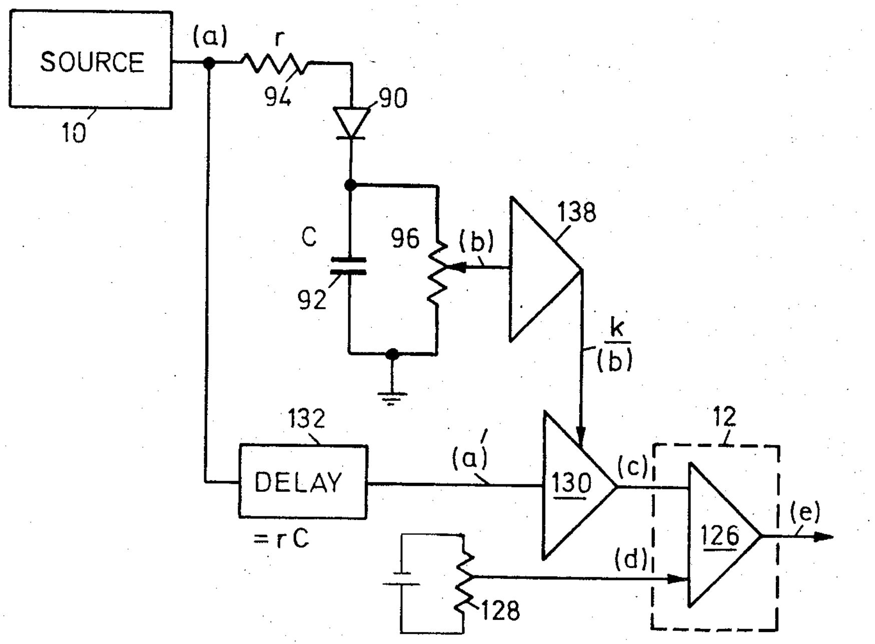

FIG. 21 illustrates a further embodiment of the invention which operates on the same principle as that of FIG. 19 and to this end, similar items have been identified by the same reference numerals. However the control signal for the variable gain amplifier 130 is derived in a different manner from that illustrated in FIG. 19. In FIG. 21, the low pass filter and inverting amplifier are replaced by a peak value detector circuit corresponding to that of FIG. 15 and the same reference numerals have been used to denote similar items, the operation of which is as described with reference to FIG. 15. Instead of the voltage obtained across the potentiometer 96, being applied to a comparator, as in FIG. 15, it provides an input for an inverting buffer amplifier 138 which provides an output signal proportional to the inverse of the voltage developed across potentiometer 96. This signal from buffer amplifier 138 is arranged to serve as a gain control signal for the variable gain amplifier 130 and waveforms obtained at various points in circuit of FIG. 21 are shown in FIGS. 22*a* to 22*e*.

Figure 22:
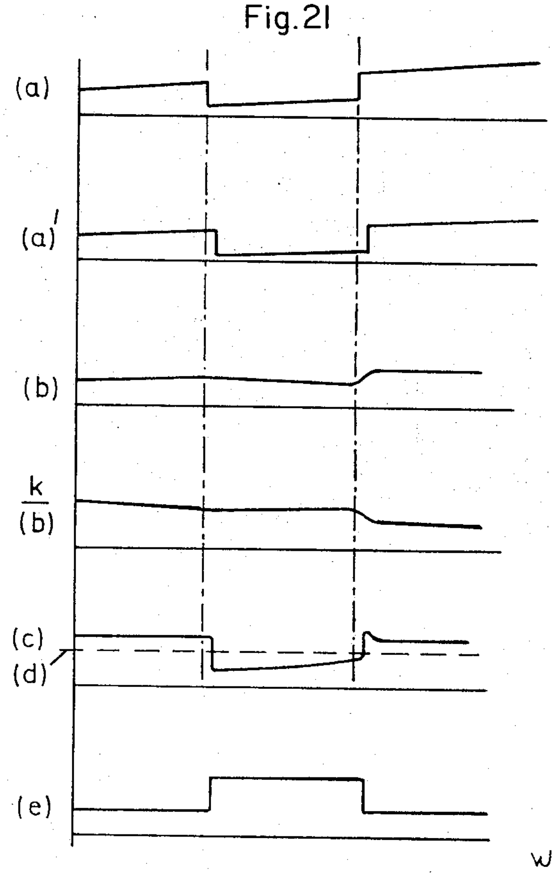

As before, FIGS. 22*a* and 22*a'* illustrate the idealised video waveform from the source 10 and the same waveform displaced in time due to the delay 132. FIG. 22*b* illustrates the peak value signal developed across potentiometer 96 and that immediately below FIG. 22*b*, illustrates the waveform obtained after inversion in the buffer inverting amplifier 138. Assuming that no inversion occurs within the variable gain amplifier 130, the output from this amplifier for the idealised video signal of FIG. 22*a* is as shown at FIG. 22*c* and superimposed on this waveform is a constant threshold level *d*, derived from potentiometer 128. The resulting detected video signal is illustrated at FIG. 22*e*.

Figure 17:
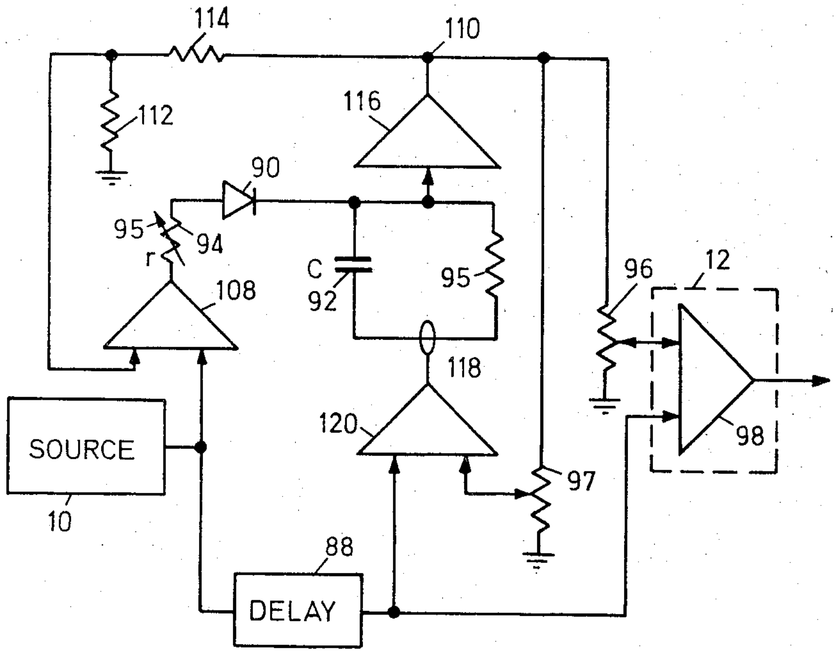
FIG. 17 illustrates a practical realisation of the idealised circuit of FIG. 15. Where appropriate the same reference numerals have been used and only those parts of FIG. 17 not common to FIG. 15 will be described.

It will be appreciated that the various circuit refinements of FIG. 17 may also be incorporated in the peak value detector circuit employed in FIG. 21. However for simplicity, the simplified version of FIG. 15 has been included in FIG. 21 for illustration purposes.

What I claim is:

1. In an image analysis system employing a source of scanned video signal and threshold detector means for generating a binary signal whose value depends on the fulfillment or otherwise of the detection criterion, the improvement comprising a peak value integrating circuit having one time constant for a rising video signal and a different time constant for a falling video signal to produce a correcting voltage which is proportional to the peak of the video signal, means for supplying the correcting voltage to the detector means as the threshold voltage therefor, the variations in the correcting voltage serving to compensate for shading distortion in the video signal amplitude, means for increasing the time constant of said integrating circuit to a high value, and means for detecting the duration of an intersection of a line scan with a feature and for activating the means for increasing the integrating circuit time constant for the duration of each such intersection.

2. An image analysis system according to claim 1 further comprising means for delaying the unmodified video signal by a time interval equal to the rise time of the signal path containing the so-called integrating circuit and means for supplying the delayed video signal to the detector.

3. An image analysis system according to claim 2 further comprising a subsidiary threshold detector having a preset threshold for detecting the amplitude excursions of the video signal which exceed the preset threshold to generate a binary output signal one of the two values of which are operative to activate the means for increasing the ingetrating circuit time constant.

* * * * *